United States Patent Office 3,549,699
Patented Dec. 22, 1970

---

3,549,699
α-CHLORO-α-CHLOROSULFENYL-PHENYL ACETYL CHLORIDE AND A PROCESS FOR THE PREPARATION THEREOF

Myron S. Simon, Newton Centre, Mass., assignor to Polaroid Corporation, Cambridge, Mass., a corporation of Delaware
No Drawing. Continuation-in-part of application Ser. No. 590,095, Oct. 27, 1966, which is a continuation of application Ser. No. 292,134, July 1, 1963. This application May 5, 1967, Ser. No. 636,282
Int. Cl. C07c 51/58, 63/54
U.S. Cl. 260—544      2 Claims

---

ABSTRACT OF THE DISCLOSURE

The present invention relates to novel sulfenyl chlorides and the syntheses of these compounds by reacting phenylacetic acid or a substituted phenylacetic acid with an excess of thionyl chloride and a small amount of pyridine.

---

This application is a continuation-in-part of application Ser. No. 590,095, filed Oct. 27, 1966, which, in turn, is a continuation of application Ser. No. 292,134, filed July 1, 1963 (now abandoned).

This invention is concerned with organic chemistry, and more particularly, with novel sulfenyl chlorides and their syntheses.

Accordingly, the principal objects of this invention are to provide novel sulfenyl chlorides and a novel synthesis thereof.

Other objects of the invention will in part be obvious and will in part appear hereinafter.

The invention accordingly comprises the product possessing the features, properties and relation of components, and the process involving the several steps and the relation and order of one or more of such steps with respect to each of the others, which are exemplified in the following detailed disclosure, and the scope of the application of which will be indicated in the claims.

For a fuller understanding of the nature and objects of the invention, reference should be had to the following detailed description.

It has been unexpectedly discovered that sulfenyl chlorides having the formula:

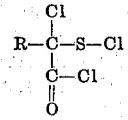

wherein R is a phenyl radical of the formula:

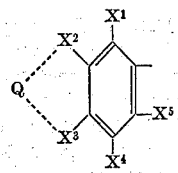

wherein $X^1$, $X^2$, $X^3$, $X^4$ and $X^5$ are each independently selected from the group consisting of —H; —$NO_2$; —$OC_nH_{2n+1}$, with $n$ as a positive integer of 1 to 5; —Cl; —Br; —I; and —$C_nH_{2n+1}$, with $n$ as a positive integer of 1 to 5; and having the provision that an alkyl group shall not be ortho or para to a nitro group; and wherein $X^2$ and $X^3$ can be carbon atoms linked together through Q, which represents the carbon atoms necessary to form a fused ring structure, may be prepared by reaction of appropriate phenylacetic acids with excess thionyl chloride and a small amount of pyridine. The results were quite surprising, as one would ordinarily expect to obtain phenylacetyl chlorides that do not possess a chlorosulfenyl linkage.

Typical examples of phenylacetic acids which can react to form the novel sulfenyl chlorides include:

2,5-diethoxyphenylacetic acid;
2,5-dimethoxy-4-nitro phenylacetic acid;
phenylacetic acid;
naphthylacetic acid;
2,4-dichlorophenylacetic acid;
3-tolyl acetic acid;
2,4,6-tribromo phenylacetic acid;
2-nitro-4-chlorophenylacetic acid; and
2-chloro-4-propoxy phenylacetic acid.

The following examples of this novel synthesis are given for purposes of illustration only.

EXAMPLE I

α-Chloro-α-chlorosulfenyl-phenyl acetyl chloride

Dry pyridine (2 ml.) was added dropwise to a solution of 8 g. (.059 mole) phenylacetic acid in 50 ml. thionyl chloride (freshly opened) with cooling and stirring. A yellow color developed. The mixture was refluxed overnight under anhydrous conditions. After the thionyl chloride was removed by vacuum distillation, the residual oil was treated with two 100 ml. portions of dry ether. The ether solution was decanted from an insoluble residue (discarded) and evaporated to dryness. A 93% yield (14 g.) of crude product was obtained. This was dissolved in 100 ml. dry hexane and passed through a Fluorisil/hexane column. The product was eluted with hexane as the first fraction: 9 g. (61% yield), a slightly yellowish oil. It was assigned the formula:

(A)
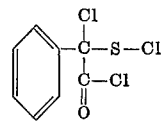

Calc'd for $C_8H_5OSCl_3$ (percent): C, 37.6; H, 1.9; S, 12.5; Cl, 41.5. Found (percent): C, 37.6; H, 1.9; S, 12.2; Cl, 41.5.

The I.R. spectrum in the carbonyl regions done as a meniscus has the following peaks: 1780 cm.$^{-1}$ (s.); 1811 cm.$^{-1}$ (s.).

EXAMPLE II 2,5-dimethoxy-phenylacetic acid (59 g.) dissolved in 180 ml. hot acetic acid was cooled until the solvent crystallized, then a solution of 40 ml. fuming (90%) nitric acid in 40 ml. acetic acid was added dropwise with stirring, keeping the temperature below 25° C. After standing in an ice-bath 20 minutes the reaction mixture was poured onto 300 g. ice and water. The solid product was filtered, washed with water, and crystallized from 1200 ml. ethanol to give 53.5 g. of 4-nitro-2,5-dimethoxyphenylacetic acid (B)
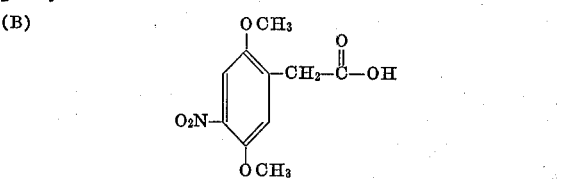

melting at 202–5.5° C. (74% yield). Recrystallization from ethanol gave material melting at 204–5° C.

*Analysis.*—Calc'd for $C_{10}H_{11}NO_6$ (percent): C, 49.79; H, 4.60; N, 5.81; O, 39.80. Found (percent): C, 50.01; H, 4.61; N, 5.99; O, 39.61.

4 g. 4-nitro-2,5-dimethoxy-phenylacetic acid (M.P. 204–5° C.) in 25 ml. freshly distilled thionyl chloride (B.P. 76° C.) and 0.5 ml. dry pyridine was refluxed three hours. The orange solution was taken down under vacuum to remove excess thionyl chloride, and the residue treated twice with dry benzene which was also evaporated off under vacuum. The residue was taken up in ether from which heavy crystals, M.P. 110–111.5° C., separated on standing. A total of 4.75 g. (about 75% yield) of the sulfenyl chloride compound assigned Formula C (below) was obtained. Recrystallization from ether raised the melting point to 112–3° C.

(C) 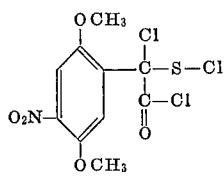

| Analyses: | Percent | | | | | | |
|---|---|---|---|---|---|---|---|
| | C | H | N | S | Cl | O | OMe |
| Calc'd for $C_{10}H_8NO_5SCl_3$ | 33.31 | 2.24 | 3.89 | 8.89 | 29.50 | 22.29 | 17.22 |
| Found: | | | | | | | |
| 1 | 33.58 | 2.14 | 3.75 | 8.43 | 29.74 | 22.02 | 17.30 |
| 2 | 33.4 | 2.1 | 3.9 | 8.9 | 29.5 | | |

NOTE.—M.W. Calc'd 360.6, Fd. 328 (Rast), 355 (vapor pressure).

The sulfenyl chloride compound is insoluble in water, being recovered quantitatively after stirring twelve hours at room temperature, but is soluble in dioxane, tetrahydrofuran, carbon tetrachloride, and benzene and slightly soluble in ether. An ether solution of the sulfenyl chloride compound releases iodine when treated with an ethanol solution of potassium iodide or propyl iodide.

Proton magnetic resonance spectra of the sulfenyl chloride in carbon tetrachloride solution, using a Varian A–60 apparatus, show only two pairs of singlets, at 3.97 and 4.03 p.p.m., and 7.47 and 7.57 p.p.m., in a ratio of 3 to 1, assignable to the six methoxyl protons and the two protons on the aromatic ring.

The I.R. spectrum in the carbonyl regions has the following peaks; 1813 cm.$^{-1}$ (m.), 1803 cm.$^{-1}$ (sh.), 1793 cm.$^{-1}$ (sh.), 1766 cm.$^{-1}$ (s.) in $CCl_4$ solution. The U.V. spectrum shows $\lambda_{max}=<220$ m$\mu$ ($\epsilon=>10,000$), 253–9 m$\mu$ (3000), 346 m$\mu$ (4100); $\lambda_{min}=290$ m$\mu$ (400) in hexane solution.

An X-ray analysis gave the lattice contants as follows: $a=10.90\pm0.01$, $b=10.35\pm0.01$, $c=14.82\pm0.02$, $\beta=121$ 45'$\pm15'$.

The analysis determined that the crystal had the monoclinic space group $P2_1/c$. Least square analysis resulted in a final reliability index for 2069 reflections of R=0.13.

The following illustrative examples demonstrate properties and uses of the novel sulfenyl chloride prepared in Example II.

EXAMPLE III 0.2 g. of the $C_{10}H_8NO_5SCl_3$ compound of Example II was dissolved in 3 ml. dioxane and 2 ml. water and the resultant solution allowed to stand at room temperature two hours. Evaporation to dryness yielded 150 mg. crude product, M.P. 188–192° C., which no longer contained halogen and which had the infrared spectrum of 4-nitro-2,5-dimethoxy-phenylacetic acid. Mixed M.P.=198–204° C.

EXAMPLE IV

One gram of the $C_{10}H_8NO_5SCl_3$ compound of Example II was heated in 150 ml. methanol at 100° C. (pressure bottle) for three days. Recrystallization yielded 0.4 g. of material M.P. 171–3° C. which was further recrystallized from methanol to give material M.P. 172–3° C. with the analysis of the ketal ester (E) 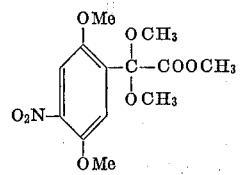

Calc'd (percent): C, 49.52; H, 5.44; N, 4.44; O, 40.60. Found (percent): C, 49.62; H, 5.57; N, 4.40; O, 40.40.

The mother liquors were chromatographed to yield a product melting at 148–54° C., which was recrystallized from acetone-hexane to yield the keto ester.

(F) 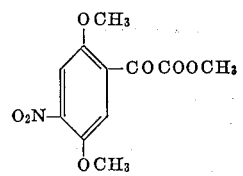

melting at 158–9° C.

Analysis showed: Calculated as $C_{11}H_{11}NO_7$ (percent): C, 49.07; H, 4.12; N, 5.20; O, 41.60. Found (percent): C, 49.14; H, 4.36; N, 5.32; O, 41.34.

The corresponding reaction with ethanol gave analogous products.

EXAMPLE V

The $C_{10}H_8NO_5SCl_3$ compound (3.6 g.) of Example II was added gradually to 20 ml. dimethyl sulfoxide. The resulting solution was heated 45 minutes on the steam bath and poured into water. The acidic solution which resulted was neutralized with solid sodium bicarbonate, filtered, and the dark yellow filtrate acidified with hydrochloric acid. The yellow crystalline solid which formed was isolated and washed well with water to give 4-nitro-2,5-dimethoxy-benzoic acid melting at 192–3° C. Recrystallization from benzene yielded 1.32 g. (58%), M.P. 196–7.5° C. Further recrystallizations raised the melting point to 197–8° C.

Analysis showed: Calc'd $C_9H_9NO_6$ (percent): C, 47.58; H, 3.99; N, 6.17; O, 42.26. Found (percent): C, 47.81; H, 3.92; N, 6.29; O, 42.13.

Refluxing the benzoic acid in ethanol and a drop of concentrated $H_2SO_4$, neutralizing with solid sodium bicarbonate, and extracting with benzene gave a solution which, on treatment with hexane, yielded the ethyl ester, M.P. 95–6° C. Recrystallization from ethyl acetate-hexane gave the analytical sample, M.P. 96–8° C., analysis of which showed: Calc'd $C_{11}H_{13}NO_6$ (percent): C, 51.76; H, 5.13; N, 5.49; O, 37.61. Found (percent): C, 51.64; H, 4.94; N, 5.52; O, 37.50.

EXAMPLE VI 1.8 g. of the $C_{10}H_8NO_5SCl_3$ compound of Example II and 1.5 g. o-phenylenediamine were refluxed in 25 ml. benzene. An orange solid separated from the solution. The solid was washed with 5% HCl to yield 1.6 g. yellow solid, M.P. 305–8° C. Purification by acetone recrystallization raised the melting point to 329–331° C. The product was the quinoxaline:

(G) 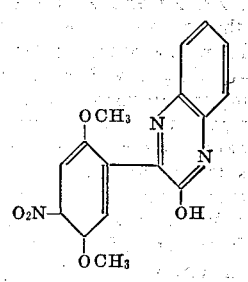

Calc'd $C_{16}N_{13}N_3O_5$ (percent): C, 58.71; H, 4.00; N, 12.84; O, 24.44. Found (percent): C, 58.65; H, 3.91; N, 12.99; O, 24.37.

The keto ester

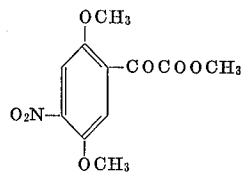

(250 mg.) was treated with 300 mg. o-phenylenediamine in 10 ml. benzene and worked up in the same manner to yield 160 mg., M.P. 332–3° C., whose infrared spectrum showed it to be the same quinoxaline as obtained above.

It will be apparent from the above examples that the novel sulfenyl chlorides of this invention are useful in the preparation of numerous compounds, and thus provide the research chemist with a useful new tool.

Since certain changes may be made in the above process and product without departing from the scope of the invention herein involved, it is intended that all matter contained in the above description shall be interpreted as illustrative and not in a limiting sense.

What is claimed is:
1. A novel sulfenyl chloride compound of the formula:

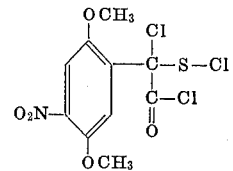

2. The process comprising refluxing 4-nitro-2,5-dimethoxy phenylacetic acid with pyridine and excess thionyl chloride, thereby forming a sulfenyl chloride of the formula:

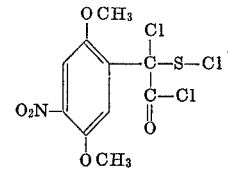

References Cited

UNITED STATES PATENTS 3,314,870  4/1967  Borner _____ 204—158

LORRAINE A. WEINBERGER, Primary Examiner

E. J. GLEIMAR, Assistant Examiner